United States Patent [19]

Marder

[11] 4,333,592
[45] Jun. 8, 1982

[54] APPARATUS FOR HANDLING DEFORMABLE COMPONENTS SUPPORTED IN A MATRIX

[75] Inventor: William Z. Marder, Pennington, N.J.
[73] Assignee: RCA Corporation, New York, N.Y.
[21] Appl. No.: 221,377
[22] Filed: Dec. 30, 1980
[51] Int. Cl.³ ............................ G03B 1/18; G03B 1/24
[52] U.S. Cl. ........................................ 226/52; 226/82; 226/84
[58] Field of Search .................. 226/52, 55, 76, 82, 226/84, 85, 86, 87

[56] References Cited

U.S. PATENT DOCUMENTS

| | | | |
|---|---|---|---|
| 2,172,812 | 9/1939 | Van Weenen | 226/82 |
| 3,281,037 | 10/1966 | Young | 226/76 X |
| 3,347,433 | 10/1967 | Bernard | 226/52 |
| 3,531,591 | 9/1970 | Jarmy | 226/76 |
| 3,750,919 | 8/1973 | Hoffman | 226/52 |

Primary Examiner—Edward J. McCarthy
Attorney, Agent, or Firm—E. M. Whitacre; J. S. Tripoli; E. P. Herrmann

[57] ABSTRACT

A matrix of thin, deformable component elements is advanced by a mechanism so that at least the most immediate element of the matrix is maintained registered and non-deformed during translation. The mechanism includes a circumferentially faceted wheel, with teeth protruding radially from the facets for engaging holes in the matrix and indexing the matrix when the wheel is rotated. A rectangular plate pivoted about one end and arranged to rotate with the wheel has a surface which engages one facet of the wheel parallel thereto. The plate clamps the matrix between the plate and wheel precluding relative motion of that element with the wheel during rotation of said wheel and precluding deformation of the elements during such rotation or translation.

7 Claims, 5 Drawing Figures

APPARATUS FOR HANDLING DEFORMABLE COMPONENTS SUPPORTED IN A MATRIX

This invention relates to material handling apparatus and in particular to an apparatus for registering and advancing fragile elements supplied in matrix format without deforming or distorting such elements.

Certain types of material parts are extremely difficult to assemble because of their fragile or delicate nature. An example of such a part is the leafspring which is employed in a video disc player signal pickup cartridge to establish the necessary pressure needed between the pickup transducer and the disc record. One particular leafspring, made of a beryllium copper alloy has approximate length, width and thickness dimensions of 2.1×0.06×0.0013 cm and includes areas where the width is narrowed to 0.013 cm. It should be readily anticipated that such a structure will deform upon handling, i.e., it is difficult to pick up or move the item without it being twisted, stretched, turned, bent or creased.

Typically, items such as the leafspring are manufactured by photolithographic-chemical etch techniques wherein a number of springs are made simultaneously and bound together in a matrix. Handling of the springs is facilitated by the matrix configuration, however, the matrix does not totally immunize the individual elements from deformation when the matrix is advanced, in for example an automatic assembly apparatus.

The present invention is a mechanism for advancing a matrix of thin, deformable component elements so that at least the most immediate element is maintained registered and non-deformed during translation and extraction from the matrix. The mechanism comprises a circumferentially faceted wheel, with teeth protruding radially from the facets for engaging holes in the matrix and indexing the matrix to the facets when the wheel is rotated. A rectangular plate pivoted about one end and arranged to rotate with the wheel has a surface which engages one facet of the wheel parallel thereto. The plate clamps the matrix between the plate and wheel precluding relative motion of that element with the wheel during rotation of said wheel and precluding deformation of the elements during such rotation or translation. An aperture, generally conformal to the component element and coincident therewith is provided in the plate for removal of the component element from the matrix. Each facet of the wheel includes an anvil which can be radially displaced against a spring, the shape of the anvil conforming to the shape of the component element and being coincident therewith. A plunger enters the conformed aperture of the rectangular plate to engage the component in coincidence with the anvil and forces the anvil radially inward. This removes the component from the matrix by shearing or by yielding in tensions, tabs which hold the component in the matrix webbing. The component is removed from the assembly by retraction of the plunger, the component adherent thereto by virtue of a vacuum created at the engaging surface.

The invention will be more readily understood from the following detailed description in conjunction with the accompanying drawings.

In the drawings

FIG. 4 is a pictorial sequence illustrating the operation of the FIG. 2 apparatus; and.

Figure 1:
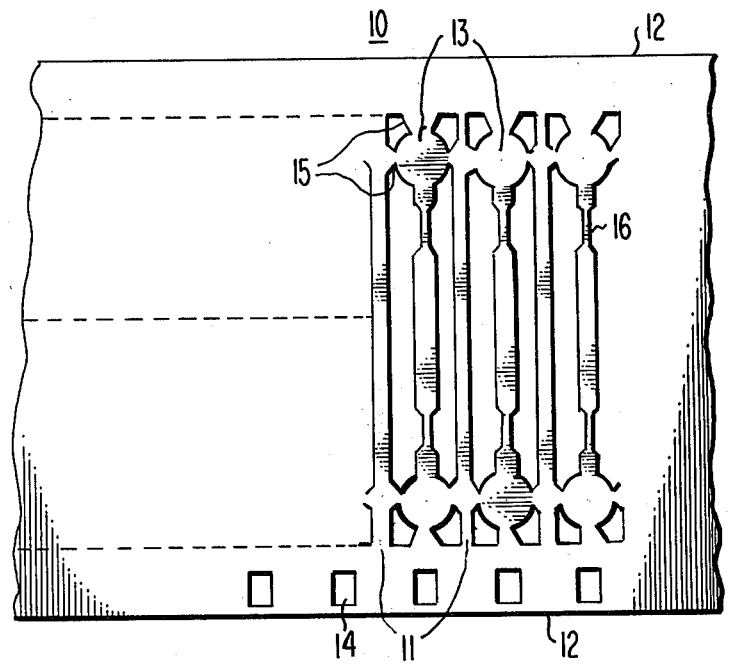
FIG. 1 is a 1×N matrix of thin highly deformable components for assembly into a subassembly.

Referring to FIG. 1, a matrix 10 comprised of extremely thin material, e.g., 0.0013 cm beryllium copper alloy, includes component parts 13 and matrix structural elements 11 and 12. The matrix structural elements tend to maintain the physical integrity of the matrix and support the component parts. Each of the component parts is secured to the matrix by tabs 15 with the entirety of the matrix, including the component parts being a contiguous material. At least one of the side matrix elements 12 contains holes 14 for indexing the matrix, one index hole for each component.

The component parts 13 in the particular matrix illustrated are long relative to their width and considering the thickness dimension of the matrix are easily deformable. This aspect is compounded by the narrowed regions 16 which contribute to the fragility of the parts. It should be readily appreciated that it would be extremely difficult to handle such parts absent the matrix supporting structure.

Figure 2:
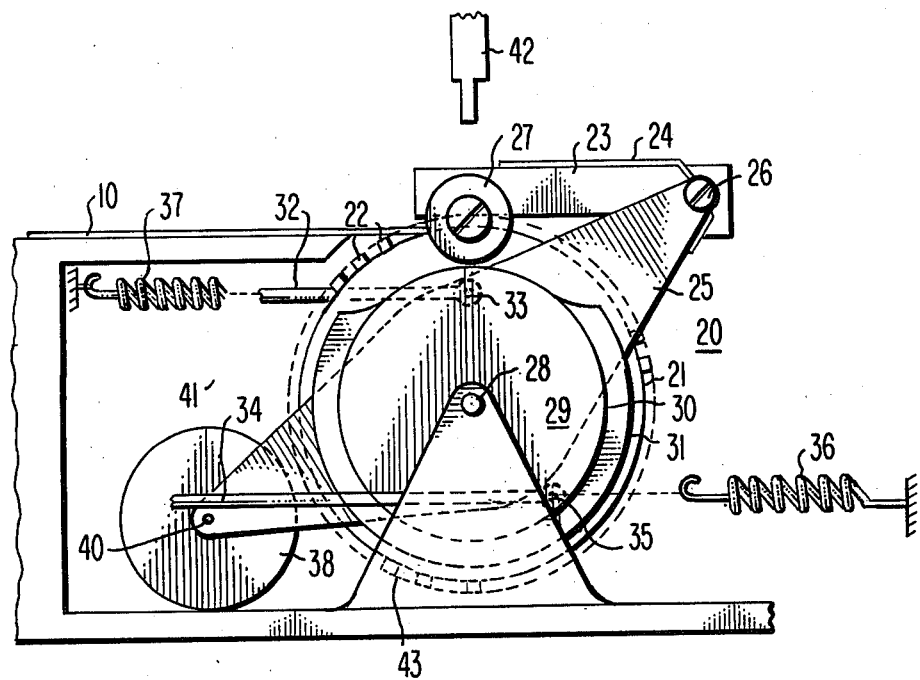
FIG. 2 is a side view schematic diagram of an assembly for translating a matrix of components (such as the FIG. 1 matrix) to a work station for selective removal of the components.
Figure 3:
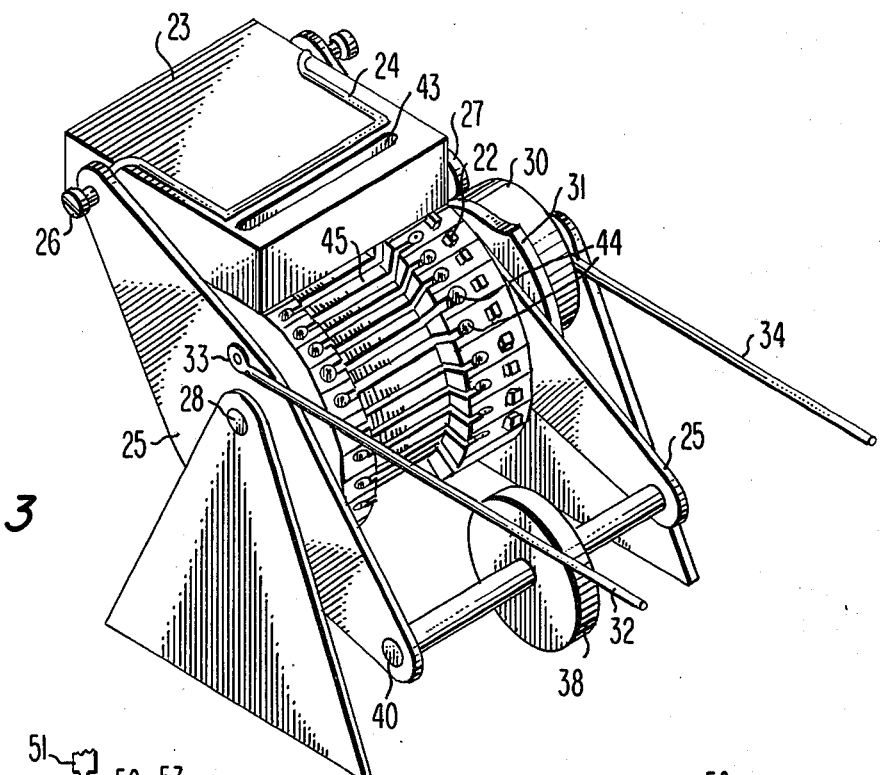
FIG. 3 is a perspective view of a portion of the translation apparatus.

One particular embodiment of the invention for automatic translation of the matrix 10 without deforming the component parts is illustrated in FIG. 2 and FIG. 3. In FIG. 2 the matrix 10 is placed on the smooth platform 41 and advanced to the toothed wheel 21 so that the indexing holes 14 of the matrix engage the teeth 22. The wheel 21, supported by the base structure 43, is faceted so that the component parts 13 of the matrix each reside on a separate facet and are in a non-arced condition; the width of the wheel being substantially as wide or wider than the matrix. As the wheel is rotated about the axis 28 secured to base 43 the matrix is carried rightward (see FIG. 4) in quantum steps resulting in each component part ultimately being positioned in alignment with the plunger mechanism 42 for removal from the matrix (FIG. 5).

Each facet of the wheel 21 has a tooth for engaging the matrix indexing holes and is sufficiently long to extend beyond the matrix when the matrix is resident on the wheel. In addition, each facet contains two anvils 44 shaped to conform to the ends of the component parts 13 and arranged to be coincident therewith when the matrix is indexed to the tooth of that facet. The anvils are independently mounted for radial movement toward the center of the wheel 21. The outermost surface of the anvils are substantially coplanar with the surface of the respective facet. A slot or groove is provided between each pair of anvils so that the component part 13 of the matrix can be displaced radially inward with respect to the circumference of wheel 21 without deformation of such part. The slot may be conformal to the shape of the component or as in the FIG. 3 wheel may be essentially two short slots adjacent the respective anvils with a common recess 45 removed from the surface of the wheel between the anvils.

A plate 23, pivotally connected by an axle 26 to links 25, is arranged to have a flat surface coplanar with one facet of wheel 21. The links 25 are rotatable about axis 28 so that the flat surface of the plate 23 may be positioned over and parallel with the facets of the wheel. The flat surface of the plate is then caused to rotate toward the wheel to clamp the matrix between the plate and the wheel facet. A recess in the surface of the plate engages the tooth on the facet so that rotation of the link 25 will cause equal rotation of the wheel 21.

A slot 43 is provided in the plate 23 so that the component part 13 of the matrix may be accessed therethrough. A wire spring 24 pivoted about axis 26 and biased against the links 25 provides the clamping force to the plate. The plate 23 is rotated toward or away from the wheel 21 by the roller or cam follower 27 which is rotatably secured to the plate 23. Roller 27 rides on the surface of a cam which is pivoted about axis 28. The cam surface in FIGS. 2 and 3 is provided by wheel 29 which has a first larger radial surface 31 and a portion thereof which is reduced to a second smaller radial surface 30. The cam is rotated clockwise by a leftward force applied to rod 34 which is pivotally connected to wheel 29 at point 35. It is returned to its relaxed position (rotated counterclockwise) by the coil spring 36 when the leftward force applied to the rod 34 is relaxed. When the cam is in the relaxed position, i.e., the present position illustrated in FIG. 2, roller 27 is not in contact with the cam (radius 30) and the full force of the wire spring 24 is applied to clamp the matrix between the plate 23 and the wheel 21. On the other hand, clockwise rotation of wheel 29 by a leftward force on rod 34 brings the outer radius 31 of the cam in contact with the roller 27 forcing the plate 23 out of contact with the matrix and the wheel 21.

Attached to the links 25 is an eccentric 38 which is rotatably adjustable to establish the limit of counterclockwise rotation of links 25 and thereby adjust the terminal position of the plate 23 with respect to the wheel 21. The links 25 are rotated in a clockwise direction by virtue of rightward force applied to rod 32 which is connected to the link at point 33. The links are returned to the relaxed position (shown in FIG. 2) by counterclockwise rotation induced by spring 37 connected to rod 32 to pull it leftward. The rods 32 and 34 may be driven by linear actuators such as solenoids or pistons or they may be translated by levers cyclically driven from a further cam mechanism arranged to synchronize motion of the relevant parts consonant with desired operation.

Figure 4:
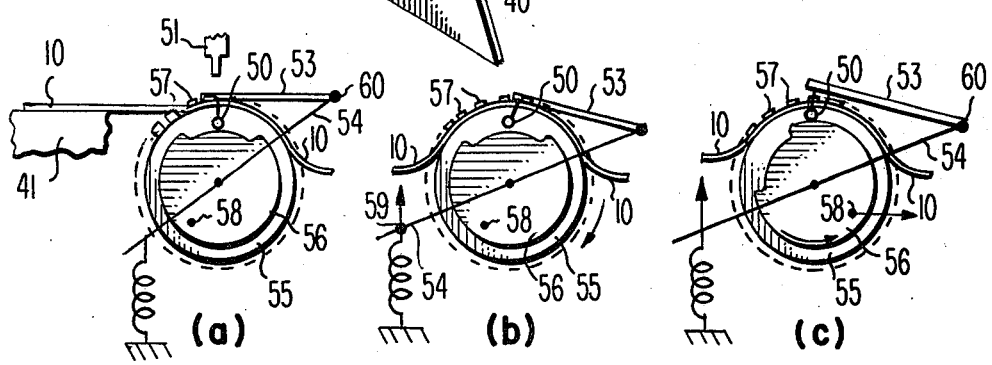
Figure 4:
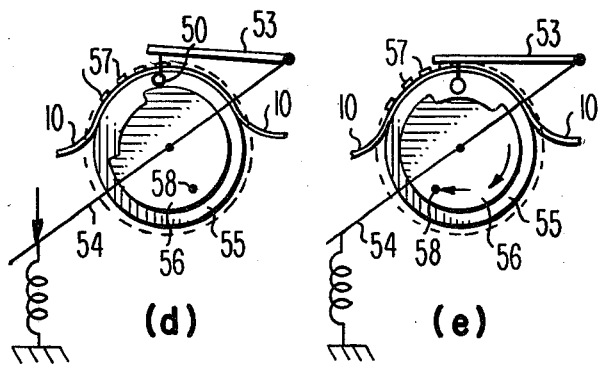
Figure 5:
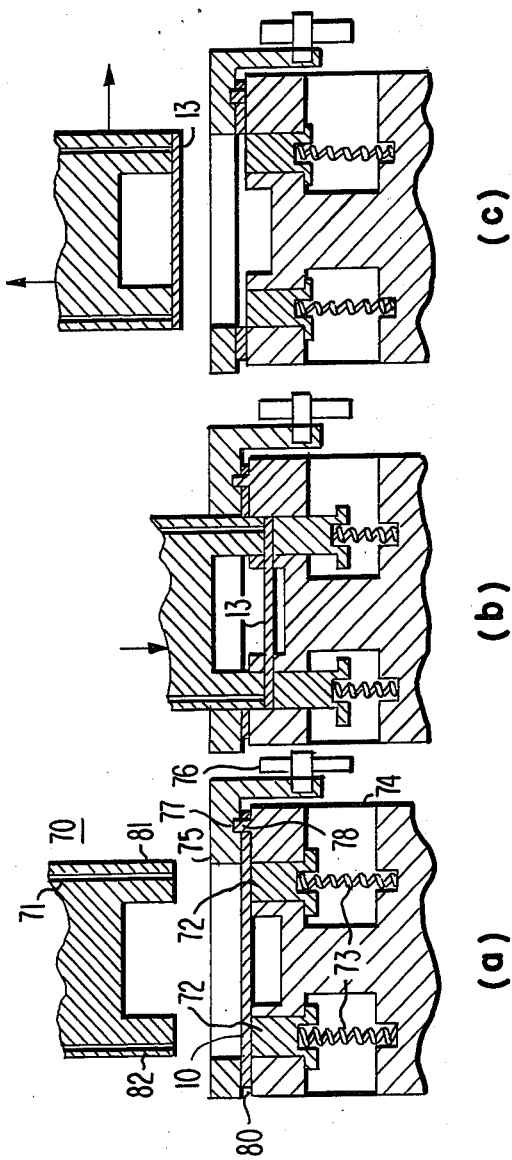
FIG. 5 is a pictorial sequence illustrating the selective removal of the components from the matrix.

Operation of the apparatus will be explicated with the aid of FIGS. 4 and 5. Consider in FIG. 4a that a component part has been removed from the matrix 10 by plunger mechanism 51, i.e., that a cycle of the apparatus has just reached completion. As will be noted in the drawing, the matrix 10 extends around the upper circumferential arc of the toothed (and faceted) wheel 55. The cam following wheel 50 attached to clamping plate 53 is addressed by the smaller radius of the cam 56 and a recess (not shown) in the plate surface adjacent the matrix is engaging the top most tooth of wheel 55. Note that several sections of the matrix (indicated by the teeth on the wheel) are positioned on the wheel and indexed by the respective teeth. Upon rotating the wheel to translate the matrix rightward, there is no relative stress between the matrix and the wheel, therefore no deformation is imparted to the matrix.

In FIG. 4b the wheel 55 is rotated clockwise by applying an upward force to the left end 59 of the link 54. The link 54 transmits rotary force to plate 53 which is clamped to the wheel causing the wheel 55 to rotate an angular increment consonant with the arc subtended by one facet on the wheel. Link 54 is maintained in this position while the cam 56 is rotated by force applied to point 58 (FIG. 4c). Rotation of the cam induces a pivoting action in the plate 53 about its connection 60 with link 54 by virtue of the cam follower 50 engaging a greater cam radius. At this point the plate 53 disengages wheel 55 and the matrix.

In FIG. 4d the link rotates counterclockwise and the plate moves leftward around the wheel by one facet on the wheel. Since the plate is disengaged from the wheel, the leftward rotation of the plate does not create a counterclockwise rotation of the wheel. A keeper or some other mechanism may be coupled with the wheel 55 to positively insure against counterclockwise rotation. The cam is rotated to the original position (FIG. 4e) permitting the plate 53 to reclamp the matrix against the relevant facet. At this point, a desired operation may be performed on the component part as it is firmly secured and registered in the apparatus.

Removal of a component part from the matrix is illustrated pictorially in FIG. 5a, b, and c. In the drawing, a cross section of a portion of the apparatus is shown containing the portion of the faceted wheel 74 immediately adjacent to the flat clamping plate 75. The recess 77 in the plate 75 which engages a tooth 78 in the faceted wheel is indicated as well as the cross section of the cam follower 76. A pair of anvils 72 are biased radially outward by respective compression springs 73. The surface of the anvils coplanar with the facet 80 of the wheel 74 are configured substantially conformal with the desired shape of the ends of the component part 13 of the matrix and adjacent thereto. The matrix structural elements 11 and 12 are rigidly held between the bottom surface of the plate 75 and the facet surface 80 of wheel 74.

A plunger mechanism 70, having first and second extensions 81 and 82 is aligned over the anvils. These extensions may be tapered to perform as shot pins and thereby register the plunger to the clamp and matrix as it enters the plate aperture. The plunger is lowered through the slot provided in the plate for access to the component part 13 until it engages the component. It is then lowered further (FIG. 5b) to shear the tabs 15 securing the component to the matrix to yield in tension thereby separating the component from the matrix. Note that the anvils yieldably travel radially inward against the compressive forces of springs 73.

Capillary tubes 71 provided within the plunger mechanism 70 are connected to a source of vacuum to hold the component against the bottom surface of the plunger permitting withdrawal of the component from the wheel assembly when the plunger is retracted (FIG. 5c). The plunger may then translate the component part to a further work station. The two plungers are shown as part of a single unit but they may be independent separate elements. It should be noted that other methods may be employed to secure the component to the plunger for component removal. For example where the components are comprised of magnetic material magnets may be incorporated in the plungers. On the other hand an adhesive or other mechanical device may be incorporated onto the bottommost portion of the plunger for securing the component.

What is claimed is:

1. An apparatus for handling deformable component parts supported in a contiguous matrix comprising:
 a wheel, the circumferential surface of which is configured in an integral number of equal facets, and having an indexing tooth protruding radially outward from each facet; said wheel being rotatably mounted at its axis of rotation to a base structure;

a generally longitudinal linking element having a first end rotatably mounted to the base structure to rotate about the same axis as the wheel, said linking element extending radially from said axis;

a clamp plate having a first end pivotally mounted to a second end of the linking element, said plate having a second end arranged substantially tangent to the wheel so that a surface of the plate may be positioned parallel with a facet of the wheel by rotation of the linking element and the matrix may be threaded between said plate and said facet, said plate surface having a recess for engaging an indexing tooth of the wheel and thereby causing the wheel to rotate when the linking element is rotated.

2. The apparatus set forth in claim 1 further including means for selectively pivoting the clamp plate.

3. The apparatus set forth in claim 2 wherein the means for selectively pivoting the clamp plate comprises:

a cam rotatably mounted to the base structure adjacent to said wheel for rotation about the same axis of rotation as the wheel;

a cam follower secured to said clamp plate and arranged to follow a circumferential surface of said cam; and means for selectively producing at least partial rotation of said cam.

4. The apparatus set forth in claim 3 further including means for selectively producing prescribed partial rotation of said linking element for causing the clamp plate to rotate said wheel in prescribed increments.

5. The apparatus set forth in claim 4 wherein the clamp plate has an aperture therein for access to a component part of the matrix resident on the facet immediately opposite the plate and removal of said component from the matrix.

6. The apparatus set forth in claim 5 wherein each facet of the wheel includes an anvil, the outermost surface of which is substantially flush with the plane of the facet, the shape of said anvil surface being substantially conformal to a selected portion of said component part and coincident therewith when the matrix is registered on the facet, the anvil being yieldably mounted so that it can travel radially inward toward the center of the wheel.

7. The apparatus set forth in claim 1 further including a platform arranged proximate the circumferential surface of the wheel, a surface of the platform being parallel with the axis of rotation of the wheel, said platform supporting a portion of the matrix not supported by the wheel.

* * * * *